United States Patent [19]

Lamensdorf et al.

[11] 4,023,136
[45] May 10, 1977

[54] BOREHOLE TELEMETRY SYSTEM

[75] Inventors: David Lamensdorf, Arlington; Alexander Murray Nicolson, Concord, both of Mass.

[73] Assignee: Sperry Rand Corporation, New York, N.Y.

[22] Filed: June 9, 1975

[21] Appl. No.: 585,000

[52] U.S. Cl. .................... 340/18 NC; 340/18 CM; 340/18 FM; 60/641; 73/155; 325/28
[51] Int. Cl.² ................ G01V 1/40; H04B 1/00
[58] Field of Search .... 340/18 NC, 18 CM, 18 FM; 73/155; DIG. 6; 175/40, 48; 33/312; 60/641; 324/1, 5; 325/28, 113

[56] References Cited

UNITED STATES PATENTS

| | | | |
|---|---|---|---|
| 91,599 | 3/1909 | Murgas | 325/28 |
| 2,505,144 | 4/1950 | Rutherford | 340/18 FM |
| 2,957,159 | 10/1960 | Fitchette | 340/18 NC |
| 3,186,222 | 6/1965 | Martin | 73/155 |
| 3,437,992 | 4/1969 | Johnston | 340/18 NC |
| 3,821,696 | 6/1974 | Harrell et al. | 340/18 CM |
| 3,824,793 | 7/1974 | Matthews | 60/641 |
| 3,829,767 | 8/1974 | DaLogne | 325/28 |
| 3,905,010 | 9/1975 | Fitzpatrick | 340/18 NC |
| 3,905,196 | 9/1975 | Govindarajan et al. | 60/641 |

Primary Examiner—Nelson Moskowitz
Attorney, Agent, or Firm—Howard P. Terry; Seymour Levine

[57] ABSTRACT

A geothermal well power-generation system is monitored by sensors permanently associated with the operating power generation system. These sensors detect changes in well water temperature, water pressure below and above the pump, and pump rotating speed. The data obtained is transmitted to a receiver at the earth's surface via sections of the system's plumbing which are utilized as an electromagnetic transmission line.

6 Claims, 4 Drawing Figures

BOREHOLE TELEMETRY SYSTEM

BACKGROUND OF THE INVENTION

1. Field of the Invention

The invention relates generally to measurement, communication, and performance monitoring apparatus used in the installation and operation of geothermal well power systems of the kind providing for the generation of electrical or other power by utilizing energy from subterranean geothermal sources and, more particularly relates to electromagnetic transmission lines for transmitting operating data of such geothermal power systems to the earth's surface.

2. Description of the Prior Art

The present invention is designed for use in operating geothermal well power generation systems of the general kind disclosed in U.S. Pat. No. 3,824,793 entitled "Geothermal Energy System and Method" issued July 23, 1974 and U.S. Pat. No. 3,938,334 issued Feb. 17, 1976 entitled "Improved Geothermal Energy Control System and Method" and U.S. Pat. No. 3,910,050 issued Oct. 7, 1975 entitled "Geothermal Energy System and Control Apparatus", all of which are assigned to the Sperry Rand Corporation. The foregoing illustrate features of a geothermal energy transfer and utilization system that extracts thermal energy stored in hot solute-bearing well water to generate super-heated steam from an injected flow of clean water; the super-heated steam is then used in operating a turbine-driven pump at the well bottom, pumping the hot solute-bearing water at high pressure and in liquid state to the earth's surface, where transfer of its heat content to a closed-loop boiler-turbine-alternator combination is effected for the generation of electrical or other power. Cooled, clean water is regenerated by the surface-located system for re-injection into the deep well and the residual, concentrated solute-bearing water is pumped back into the earth.

Geothermal wells of this and other types may be logged to a useful extent by methods applied previously in the oil well industry. In such tests, a canister which may contain sensors, a battery, and a recorder is lowered into the well and is then brought back to the earth's surface where the recorded data is retrieved. This time-consuming method is undesirable even in the oil well application, as it is not a real-time method and requires removal of equipment from the well. Where an operating system such as a geothermal well pump is present, removal of the pump system is not economical and only secondary means of obtaining data from the deep well pump site are available.

For example, in the aforementioned application U.S. Pat. No. 3,910,050 reliable operation of the system is assured by a control arrangement in which the pressure of clean water entering the subterranean steam generator determines the rate of mass flow through the pump-driving steam turbine and consequently determines the proper pressure of the hot pumped well water. By control of the output pressure of the clean water pump at the earth's surface, the pumped hot well water pressure is determined. The novel arrangement also permits controlled starting and stopping of the deep well pumping apparatus, permitting the bearings thereof to be adequately lubricated at all times. While the arrangement of application Ser. No. 487,429 is advantageous in an established geothermal power system, direct measurements of primary parameters that instantaneously reflect the efficiency of operation of the deep well geothermal pump system, parameters whose values are particularly of interest during installation and initial operation of the system and even during its continued operation, are not conveniently provided by it. When a change in the output characteristics of a pumped well is observed only at the well head, it is difficult or impossible to assign the cause of the change to a particular problem at the deep well pump location. Thus, more direct evidence is needed in addition to control signals of the general type previously available.

SUMMARY OF THE INVENTION

The invention provides means for the continuous and instantaneous monitoring of deep well geothermal energy systems of the general kind described in the aforementioned U.S. Pat. Nos. 3,824,793, 3,910,050 and 3,938,334. In such systems, there is provided an efficient means for the generation of electrical power at the earth's surface, using energy extracted from a subterranean geothermal source. The apparatus includes means for the efficient and reliable generation of super-heated steam to operate a steam driven pumping system at the hot water well bottom which transfers hot water to the earth's surface where its energy content is beneficially used for electrical power generation.

In the installation and operation of one or more such geothermal wells at a geothermal site, continuous monitoring and analyzing of the individual wells is desired. Permanently installed sensors are required for detecting changes in fluid pressure and temperature that are too small to be detected accurately by secondary means. These small changes may develop only over an extended period of time, but may ultimately induce effects of material significance with respect to the life and efficiency of a given deep well pump installation.

The parameters of interest for direct observation include well water pressure and temperature immediately below the pump, the pressure increment across the pump, and the rotational speed of the pump. According to the preferred embodiment of the present invention, data obtained at the deep well pump location by various sensors, are transmitted to a receiver at the surface via a unique electromagnetic transmission line which is formed by the internal plumbing of the geothermal energy system.

DESCRIPTION OF THE PREFERRED EMBODIMENTS

Figure 1:
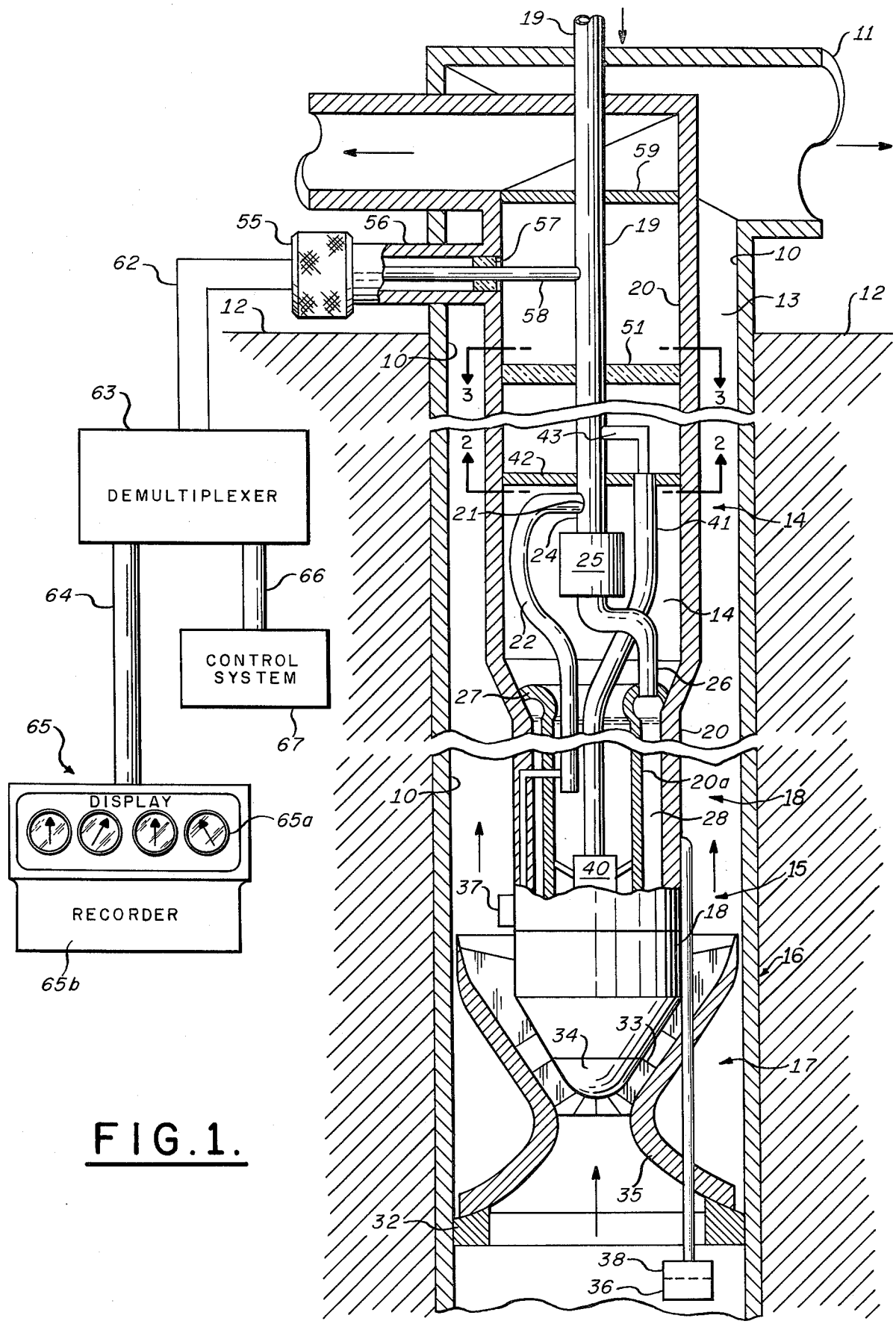
FIG. 1 is an elevational view, mostly in cross-section, of the deep well geothermal pumping apparatus of the geothermal energy system showing the electromagnetic transmission line and the means for coupling input and output signals.

FIG. 1 illustrates the general structure and characteristics of that portion of a geothermal energy extraction system immersed in a deep well extending into strata far below the surface of the earth, preferably being located at a depth below the surface such that a copious supply of extremely hot geothermal water under high pressure is naturally available, the active pumping structure being located adjacent to the water source and within a generally conventional well casing pipe 10. The configuration in FIG. 1 is seen to include a well head section 11 normally located above the earth's surface 12 and a main well section 13 extending downward from well head section 11 and below the earth's surface 12. At the subterranean source of hot, high pressure water, the main well section 13 joins a steam generator section 14. The steam generator section 14, the steam turbine section 15, a power plant rotary bearing section 16, and a hot water pumping section 17 follow in close cooperative succession at increasing depths. Interposed between the steam generator section 14 and the steam turbine section 15 is an instrumentation section 18 which generates electrical signals representative of the data obtained by the monitoring sensors which are included in the system.

Extending downward from the well head section 11 at the earth's surface 12, the well casing pipe 10 surrounds, in preferably concentric relation, an innermost stainless steel or other high quality alloy steel pipe or conduit 19 which applies a flow of relatively cool and relatively pure water from the earth's surface 12 to the bottom of the geothermal well. A second relatively large pipe or conduit 20 surrounding pipe 19 is also provided within well casing 10, extending from well head 11 to the energy conversion and pumping system at the bottom of the well and permitting turbine exhaust steam to flow upward to the surface of the earth.

It will be seen from FIG. 1 that relatively clean and cold water is pumped down the inner pipe 19 from the earth's surface 12 to the region of the pipe tee 21. At tee 21, the downward flowing water is divided between two branch paths. A first branch path feeds clean lubricating water through pipe 22 for lubricating a system of bearings contained within the system bearing section 16. A second branch path 24 feeds clean water through pressure regulator system 25 and via distribution pipe or pipes 26 to the input manifold 27 of a steam generator 28 formed between the generally concentric walls of pipes 20 and 20a. Accordingly, high pressure steam is generated and delivered to a steam turbine located within turbine section 15.

The function of the turbine located at section 15 is to drive a hot well water pump located at section 17. Hot, high pressure water is thus impelled upward past seal 32 by the rotating pump vanes 33 between the rotating conical end 34 of the pump and the associated stationary shroud 35. The hot water is pumped upward at high velocity in the annular conduit between pipes 20 and 10, thus permitting use of the thermal energy it contains at the earth's surface. More important, the hot well water is pumped upward to the earth's surface 12 at a pressure preventing it from flashing into steam and thus undesirably depositing dissolved salts at any point of flashing.

Accordingly, it is seen that the extremely hot, high-pressure geothermal well water is pumped upward, flowing in the annular region defined by alloy pipes 20 and 10. Heat supplied by the hot well water readily converts the clean water flowing into manifold 27 of the steam generator 28 into highly energetic, dry, super-heated steam. The clean water, before flowing through tee junction 21 and pressure regulator 25, is maintained at a very high pressure due to its hydrostatic head and to pressure added by a surface pump so that it may not flash into steam. The pressure regulator system 25 controls the pressure of the clean water flowing therethrough so that it may be vaporized and super-heated in the volume of the steam generator 28. The highly energetic steam drives the steam turbine and is redirected to flow upward to the surface 12 after expansion as relatively cool steam flowing within the annular conduit defined between alloy pipes 19 and 20. Thermal energy is recovered at the earth's surface 12 primarily from the hot, high pressure well water, but may also be retrieved from the turbine exhaust steam.

During pumping operations pump input pressure and the pumped water pressure between pipes 10 and 20 are measured by pressure sensors 36 and 37, respectively, well temperature at the pump is measured by temperature sensor 38 and the pump shaft speed is measured by a device (not shown) which is described in U.S. Pat. application Ser. No. 580,384, filed May 23, 1975 entitled "Geothermal Energy Pump and Monitor System" assigned to Sperry Rand Corporation. Electrical signals representative of these measurements are coupled to the instrumentation system 40 wherein electromagnetic carrier signals, modulated by multiplexed data signals, are generated for the transmittal of the data towards the earth's surface. These electromagnetic signals are coupled from the instrumentation system 40 to transmission line 41, whereby they are guided through the steam generator section 14 to and through an electromagnetic shorting screen 42 (which is in electrical contact with the outer conductor of transmission line 41) and coupled to the coaxial line formed by pipes 19 and 20 via coupling device 43.

Figure 2:
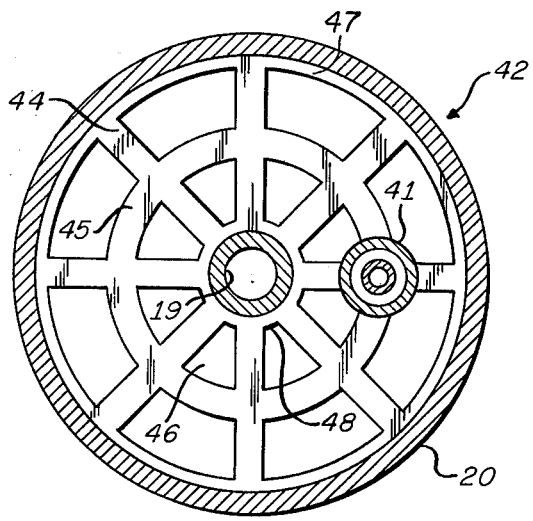
FIG. 2 is a section taken on line 2—2 in FIG. 1.

The electromagnetic shorting screen 42 is constructed to permit the steam to flow through the screen while simultaneously acting as a short circuit to electromagnetic signals. As shown in FIG. 2, the shorting screen consists of metallic members 44 extending in the radial direction from the center and metallic members 45 disposed circularly about the center with each circular member 45 in electrical contact with each radial member 44, this arrangement provides spaces 46 within the grid structure of sufficient dimensions whereby steam may flow essentially unimpeded. The outer rim 47 and the inner rim 48 of the shorting screen 42 are in electrical contact with pipes 20 and 19 respectively. Shorting screen 42 serves a multiplicity of functions including: the isolation of the transmission line formed by pipes 19 and 20 from the plumbing and other electromagnetic interfering parts within the steam generator 14; and comprising part of the electromagnetic matching system that provides for efficient transfer of electromagnetic energy from the transmission line 41 to the transmission line formed by the pipes 19 and 20.

Pipes 19 and 20 are held in essentially a coaxial configuration by means of ceramic beads 51 which are appropriately spaced along the length of the pipes 19 and 20.

Figure 3:
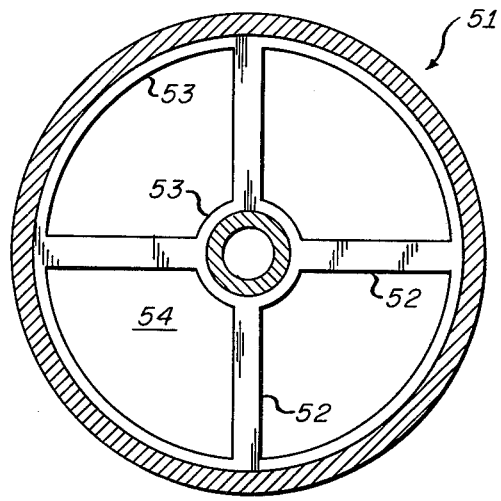
FIG. 3 is a section taken on line 3—3 in FIG. 1.

As shown in FIG. 3, the beads 51 consist of radial members 52 and circumferential members 53. The radial members 52 maintaining the spacing between the pipes 19 and 20, and the circumferential members 53 maintaining the spacing between the radial members 52, thus providing spaces 54 through which the steam may pass unimpeded.

The signal propagating from the depths of the well is received at output terminal 55 of coaxial transmission line 56 which is coupled to the transmission line formed by pipes 19 and 20 in a conventional manner. A solid ceramic bead 57, through which the inner conductor 58 of the coaxial transmission line 56 passes, seals the transmission line 56 from the steam contained in the space between the pipes 19 and 20. Isolation of the transmission system from the remainder of the surface plumbing is accomplished by means of a second electromagnetic shorting screen 59 which is similar in construction to the electromagnetic shorting screen 42. The location of the shorting screen 59 relative to the junction of transmission line 56 and the coaxial line formed by the pipes 19 and 20 is determined by matching considerations to affect a maximum transfer of energy between the coaxial line formed by the pipes 19 and 20 and the coaxial transmission line 56. The output terminal 55 of coaxial line 56 is coupled by a coaxial line 62 to demultiplexer 63. Device 63 is a conventional kind of synchronous demultiplexer operated synchronously with respect to the operation of the multiplexer of instrumentation section 18 by virtue of the periodic transmission of a synchronizing signal by the latter and its automatic use by demultiplexer 63. The newly separated signals are then coupled from demultiplexer 63 via cable 64 for presentation in any suitable conventional display 65, as upon individual electrical meters of the meter array 65a. They may additionally be recorded in a conventional multichannel recorder 65b. It will further be understood by those skilled in the art that selected ones of the demultiplexed signals may be used for control purposes as indicated in FIG. 1 wherein they may be selectively supplied by cable 66 to a control or assembly of controls represented by control system 67 wherein control signals may be generated for retransmission down the borehole, or such signals may be used to operate or to augment the operation of efficient power control apparatus such as described in the aforementioned U.S. Pat. No. 3,824,793.

Figure 4:
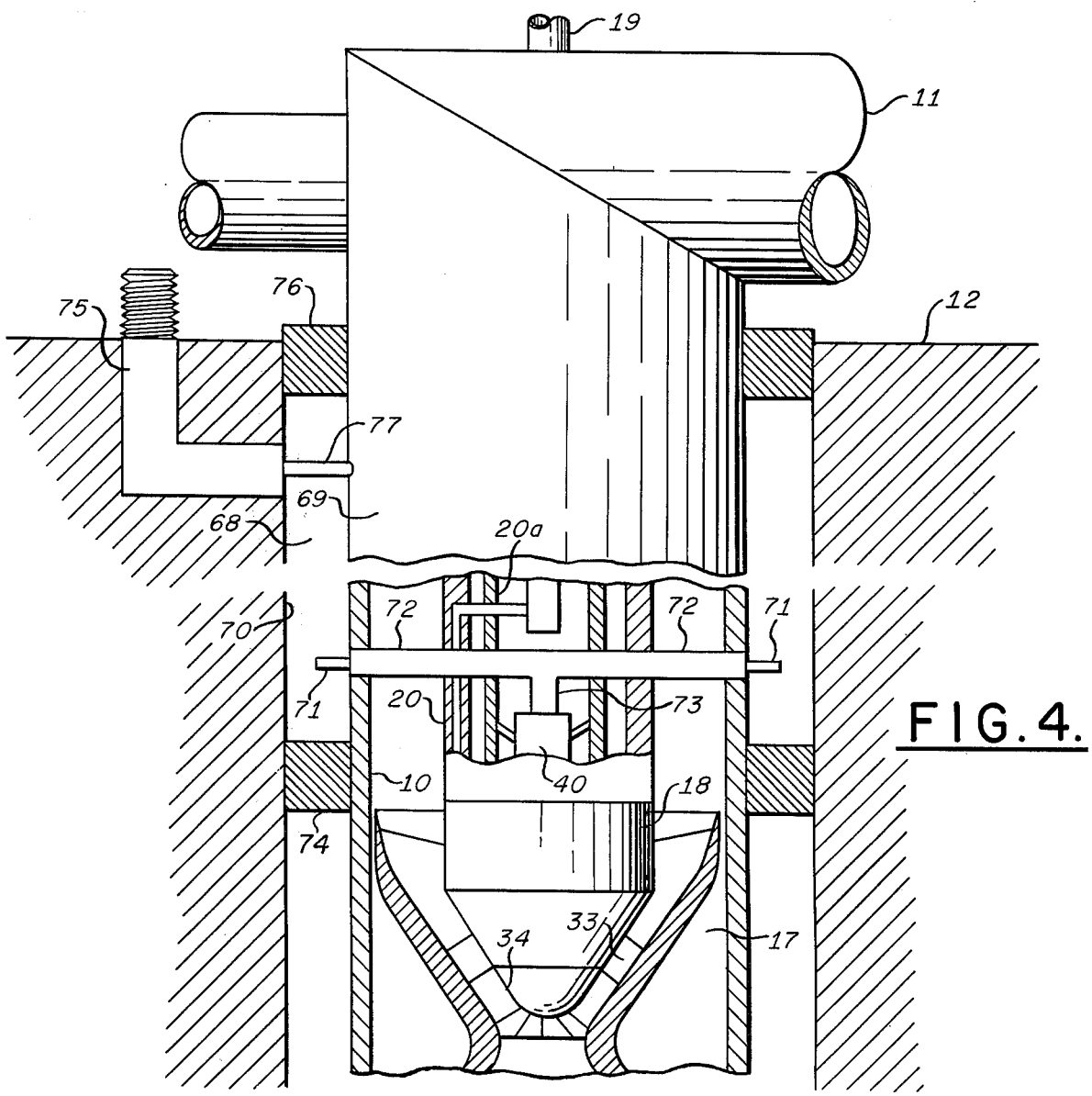
FIG. 4 is a schematic diagram of an electromagnetic transmission system which employs the outer wall of the work piece within the borehole and the walls of the borehole as the walls of an electromagnetic transmission line.

Referring now to FIG. 4, the electromagnetic signal from the instrumentation system 40 may be propagated to the surface via a transmission line 68 formed by the outer diameter of the well casing pipe 69 and the wall 70 of the well drill hole, the outer diameter of which is greater than the outer diameter of the well casing pipe 69. The well borehole may be lined with a metallic conductor thus forming a coaxial line for conducting inner and outer diameters with an air dielectric intervening. The electromagnetic signals from the instrumentation system 40 may be coupled to the transmission line 68 by means of two probes 71, diametrically positioned in transmission line 68, which project from the arms 72 of a three port coaxial tee, the third arm 73 of which is coupled to the instrumentation system 40. The outer diameter of the arms 72 being in contact with the pipes 10 and 20 in such a manner as to form a seal whereby the water between pipes 10 and 20 and the steam between pipes 20 and 20a are contained therein. A solid metallic shorting ring 74 placed an appropriate distance from the probe serves as a part of the probe matching network and as a means for isolating the transmission line from the remaining depth of the well. The electromagnetic signal propagates along the transmission line 68 to the surface whereat it propagates along transmission line 75 which is coupled to transmission line 68 in a conventional manner. A metallic shorting ring 76 seals the transmission line 68 preventing radiation leakage from the transmission line 68 at the surface and also serves as a part of the probe 77 matching network.

The removal of the metallic lining from the borehole wall 70 creates a coaxial transmission line in which the outer conductor is formed by the rock surrounding the well hole. Propagation losses along this transmission line depend upon the conductivity of the rock forming the outer diameter of the coaxial transmission line 68, but generally will be in a range comparable to that of a coaxial line with metallic inner and outer conductors, for in both cases the energy is propagated in the air space between the inner and outer conductors.

Though the transmission lines described above are formed by the casing pipe 10 of the geothermal pump and the borehole wall, it will be recognized by those skilled in the art that a transmission line operating in the manner described may be formed in the borehole by the borehole wall and other work pieces appropriately positioned therein.

While the invention has been described in its preferred embodiment, it is to be understood that the words which have been used are words of description rather than limitation, and that changes may be made within the purview of the appended claims without departing from the true scope and spirit of the invention in its broader aspects.

We claim:

1. A communications system for the transmittal of data through a geothermal pumping system from a downhole location of a geothermal well to the well head thereof, comprising:

multiplicity of transducer means for converting the magnitude of selected parameters to electrical signals;

signal generator means coupled to said transducer means for generating modulated signals representative of said magnitudes of said selected parameters;

coaxial transmission line means comprising substantially coaxial metallic pipes of said geothermal pumping system for guiding electromagnetic signals therethrough;

isolation means, in electrical contact with said pipes and positioned on said coaxial transmission line at a location above all electromagnetic reflecting surfaces located in the conduit between said metallic pipes, for establishing an electromagnetic short circuit at said location while not impeding the flow of fluid therethrough;

second transmission line means having a first port coupled to said signal generator means and a second port coupled to said coaxial transmission line means at a predetermined distance above said isolation means;

third transmission line means for guiding said modulated signals between a coupling location, whereat said third transmission line means is coupled to said coaxial transmission line, and an output port of said third transmission line means; and second isolation means, in electrical contact with said metallic pipes forming said coaxial transmission line at a predetermined distance above said coupling location, for establishing an electromagnetic short circuit thereat while not impeding the flow of fluid through the conduit between said pipes.

2. A communications system for the transmittal of data from a downhole location of the geothermal well according to claim 1 further including a multiplicity of spacing means appropriately located along the length of said coaxial transmission line formed by said substantially coaxial pipes for maintaining said pipes in a substantial coaxial relationship.

3. A communications system for the transmittal of data from a downhole location of the geothermal well according to claim 1 wherein said pipes comprising said coaxial transmission line form an annular conduit for conducting steam through said geothermal pumping system to the earth's surface.

4. A communications system for the transmittal of data from a downhole location of a geothermal well having a geothermal pumping system therein which is enclosed within a metallic cylinder that is substantially coaxial with the cylindrical wall of the borehole with electrical insulating space existing between said metallic cylinder and said borehole wall thereby forming a first coaxial transmission line wherein said communications system includes:

multiplicity of transducer means for converting the magnitude of selected parameters to electrical signals;

signal generator means coupled to said transducer means for generating modulated signals representative of said magnitudes of said selected parameters;

probe means for coupling signals from said signal generator means to said first coaxial transmission line comprising at least one metallic probe insulatedly protruding from said metallic cylinder into said space between said metallic cylinder and said borehole wall;

first isolation means positioned in said electrical insulating space at a predetermined depth below said probe means for providing electromagnetic isolation of said first coaxial transmission line thereabove from sections of said pumping system and other objects therebelow;

a second coaxial transmission line coupled to said first coaxial transmission line at a predetermined depth from the borehole head whereby data coupled from said probe means to said first coaxial transmission line is received and coupled to surface monitoring equipment; and second isolation means positioned in said electrical insulating space at a predetermined distance above said coupling of said second coaxial transmission line and said first coaxial transmission line for providing electromagnetic isolation of said communications system therebelow from said metal cylinder and other objects thereabove.

5. A communications system for the transmittal of data from a downhole location of a geothermal well in accordance with claim 4 wherein said borehole wall is lined with a metallic conductor.

6. A communications system for the transmittal of data from a downhole location of a geothermal well in accordance with claim 4 wherein said probe means comprises a first probe insulatedly) protruding from said metallic cylinder and a second probe insulatedly protruding from said metallic cylinder and positioned thereon substantially diametrically from said first probe.

* * * * *